United States Patent
Ljungkrantz et al.

(10) Patent No.: US 12,254,328 B2
(45) Date of Patent: Mar. 18, 2025

(54) SERVICE FRAMEWORK FOR DEVELOPING APPLICATION SERVICES IN A DEPENDENCY CONTROLLED SOFTWARE STACK

(71) Applicant: Volvo Car Corporation, Gothenburg (SE)

(72) Inventors: Peter Ljungkrantz, Gothenburg (SE); Jens Andersson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/732,903

(22) Filed: Apr. 29, 2022

(65) Prior Publication Data

US 2023/0350697 A1 Nov. 2, 2023

(51) Int. Cl.
  G06F 9/44 (2018.01)
  G06F 9/445 (2018.01)
(52) U.S. Cl.
  CPC .................. *G06F 9/44552* (2013.01)
(58) Field of Classification Search
  CPC .......................................... G06F 9/44
  See application file for complete search history.

(56) References Cited

U.S. PATENT DOCUMENTS

| | | | | |
|---|---|---|---|---|
| 7,370,318 B1 * | 5/2008 | Howe | ........... | G06F 8/72 |
| | | | | 717/113 |
| 7,844,963 B2 * | 11/2010 | Pitzel | ........... | G06F 8/61 |
| | | | | 717/172 |
| 8,990,817 B1 * | 3/2015 | Garai | ........... | G06N 20/00 |
| | | | | 712/E9.05 |
| 2002/0012329 A1 * | 1/2002 | Atkinson | ........... | H04L 67/34 |
| | | | | 370/282 |
| 2003/0233433 A1 * | 12/2003 | Halpern | ........... | G06F 11/1482 |
| | | | | 709/224 |
| 2006/0173907 A1 * | 8/2006 | Im | ........... | H04L 41/0233 |
| 2006/0248206 A1 * | 11/2006 | Moerdijk | ........... | H04L 67/51 |
| | | | | 709/230 |
| 2010/0141402 A1 * | 6/2010 | Eun | ........... | H04L 69/28 |
| | | | | 340/10.41 |
| 2016/0094467 A1 * | 3/2016 | Hong | ........... | H04L 63/0281 |
| | | | | 370/235 |
| 2017/0102924 A1 * | 4/2017 | Hussey | ........... | G06F 8/654 |
| 2017/0155677 A1 * | 6/2017 | Shakarian | ........... | H04L 63/1441 |
| 2017/0195183 A1 * | 7/2017 | Gershaft | ........... | H04L 41/145 |
| 2018/0041515 A1 * | 2/2018 | Gupta | ........... | H04L 63/0815 |
| 2018/0047074 A1 * | 2/2018 | Cronin | ........... | G06Q 10/00 |
| 2018/0191623 A1 * | 7/2018 | Marty | ........... | G06F 15/167 |
| 2021/0232392 A1 * | 7/2021 | Azuma | ........... | G06F 8/75 |
| 2023/0038226 A1 * | 2/2023 | Wilson | ........... | H04L 67/34 |

* cited by examiner

*Primary Examiner* — Jae U Jeon
(74) *Attorney, Agent, or Firm* — Clements Bernard Walker; Christopher L. Bernard

(57) ABSTRACT

A computer-implemented method for a service framework to develop application services, including: providing at least one module of a module stack to a client; determining if the provided module has been modified by the client; determining dependency data, at least including information on the dependency of further modules of the module stack from the provided module; and providing the dependency data of the other modules of the module stack from the provided module.

13 Claims, 4 Drawing Sheets

SERVICE FRAMEWORK FOR DEVELOPING APPLICATION SERVICES IN A DEPENDENCY CONTROLLED SOFTWARE STACK

TECHNICAL FIELD

The present disclosure relates to a computer-implemented method for a service framework to develop application services, a system that is implemented as a server-client-structure for a service framework, a computer program element and a computer readable storage.

BACKGROUND ART

In the prior art, service framework to develop application services are described which, for example, used to provide modules of a module stack, whereby these service frameworks providing the modules to requesting clients. In this context, each client may process one or more modules, and there may be dependencies between the respective modules of the module stack. Thereby, a modification due to a process of one module may cause difficulties in a dependent module.

In view of this, it is found that a further need exists to provide an improved method for a service framework to develop application services.

SUMMARY

In the view of the above, it is an object of the present disclosure to provide an improved method for a service framework to develop application services.

These and other objects, which become apparent upon reading the following description, are solved by the subject matter of the present disclosure.

According to a first aspect, a computer-implemented method for a service framework to develop application services is provided, including:
  providing at least one module of a module stack to a client;
  determine if the provided module has been modified by the client;
  determining dependency data, at least including information on the dependency of further modules of the module stack from the provided module; and
  providing the dependency data of the other modules of the module stack from the provided module.

The at least one module of a module stack may also be understood hereinafter as a module and/or a module of a module stack, although it is not intended to be described thereby as meaning only one module of the module stack.

Moreover, the service framework provide a module of a module stack and/or a service of the service framework. The client may be a computational entity that may request to use the service framework. For example, the service framework may compute and may provide a vehicle speed of a vehicle and the client, e.g., one or more clients, may connect to the service framework to request the vehicle speed.

In addition, the method may include a way to determine whether the provided module has been modified in such a way making it incompatible with the client.

In an implementation, the providing of the at least one module of a module stack and/or providing of the dependency data of the other modules of the module stack from the provided module may further include providing service interface data.

In an implementation, the service interface data may include service proxy data, whereby the service proxy data may include at least event values, method values and/or property values.

In an implementation, the service interface data may include service stub data, whereby the service stub data may include at least event values and/or property values.

In other words, the interface data may be an interface service that may be described in a service interface model. Whereby, that service interface model may be used to generate the service proxy data and/or the service stub data. With which the client may access to the service framework and/or the service framework may provide the module stack to the client.

Further, the interface service may be described with an interface definition language (IDL), preferably an IDL syntax may be created in a YAML format, whereby further formats can also be generated. Furthermore, the IDL may be used to generate a specific service proxy data and/or a specific service stub data. Thus, the interface data may provide defined services of a module of the module stack. Further, several specific service proxies and/or specific service stubs may be generated for the same interface.

Furthermore, the service proxy data and/or the service stub data may be used for at least connection management, buffer allocation and/or data serialization.

YAML is a human readable language for data serialization. The YAML formatted files are commonly used for configuration files and in applications where data is stored or transmitted.

The service proxy data and/or the service stub data may be used to provide features of communication between the service framework and the client. Moreover, the service proxy data and/or the service stub data may be used to provide similar features of communication between the service framework and the client. Whereby, the features of communication may include events from the service framework to the client, methods that the client may call on the service framework and/or properties that may be values that may be read and written by both, the client and the service framework. Further, it is also possible to subscribe to a property change in order to be notified when the client change a module of the module stack.

In an implementation, the providing of the at least one module of a module stack and/or providing of the dependency data of the other modules of the module stack from the provided module may further include providing dynamic runtime data.

Moreover, the dynamic runtime data may be used to provide a runtime and the client and a server of the service framework may use the runtime. Further, the dynamic runtime data may be used to control the transport between the client and a server of the service framework. Whereby, the controlling may be done by TCP/IP, QNX messaging, HTTP/HTTPS, direct method calls, in case the client and the service framework are in the same process and/or by other common used methods.

Further, the dynamic runtime data may be used to provide a part of a runtime on the client and another part of the runtime on a server of the service framework. Furthermore, the dynamic runtime data may be used to provide two or more runtimes, whereby the two or more runtimes may run parallel to each other. Moreover, the service framework may include more than one client and/or more than one server that may be running two or more runtimes.

Furthermore, the runtime or the two or more runtimes may be independent to the client and/or server of the service framework that may use them as well as the client and the server of the service framework may be independent to the runtime or the two or more runtimes.

Moreover, a service of the service framework may be used to provide a runtime for two or more clients of the service framework, which may be optimized to be located on the same processor of the service framework, to provide a runtime for two or more clients of the service framework, which may be optimized to be located on others processors, e.g., in a vehicle, of the service framework, and/or to provide a runtime for two or more clients of the service framework, which may be optimized for controlling a communicating of the two or more clients in the service framework, e.g., in a cloud.

In an implementation, the dynamic runtime data may include broker data, which may include at least a service framework value.

In other words, the broker data may be used to provide a broker in the service interface, which may be used as a separate process, whereby the broker may be configured to provide the service framework value to the client, which may provide an indication of an availability of more than one server of the service framework. For this purpose, the broker may consider different available versions of a module of the module stack.

In an implementation, the dynamic runtime data may include service configuration data, which may include at least a module value, a dynamic runtime value and/or a specific service value.

Moreover, the service configuration data may be used to verify the available modules of the module stack and/or services of the service framework, the availability of different instances of the same module of the module stack and/or service of the service framework, the availability of different runtimes of service framework and/or the availability of specific runtimes for a specific module of the module stack and/or service of the service framework.

In an implementation, the dynamic runtime data may include dynamically load data.

Moreover, the dynamically load data may be used to generate one or more runtimes, which may be configured to discover the service framework and communicate with it, whereby the client may generate a runtime which is most appropriate to connect to the service interface.

Further, the client and/or a server of the service framework may use the dynamic runtime data to generate one or more runtimes. Whereby, a server of the service framework may use a runtime configuration to load the runtime.

In an implementation, the dynamic runtime data may include service discovery data.

Moreover, the service discovery data may be used on the client or clients of the service framework to locate the service framework and/or connect to the service framework, whereby for example an IP and a port may be used. Further, some runtimes may also have their own running processes to support their specific implementation of service discovery and transport. Furthermore, a server of the service framework may dynamically load one or more runtimes that may be used to find and communicate with the service framework.

In other words, the service framework may decouple the client and server of the service framework from the transport and service discovery. The service framework may contain a default service discovery and/or transport implementation and/or multiple discovery mechanisms and/or multiple transport implementations.

In an implementation, the providing of the at least one module of a module stack and/or providing of the dependency data of the other modules of the module stack from the provided module may further include providing communication parameter data and/or system configuration data.

In an implementation, the at least one module may include program code for use in the application services, in particular C/C++, python, Java and/or HTTP.

Preferably, at least one module may be generated in C++, but the generating is not limited to that, any other common used program code may also be supported, such as Python and Java and/or HTTP REST.

A further aspect of the present disclosure relates to a system that is implemented as a server-client-structure for a service framework to develop application services, including:
  a module stack unit of a server unit to provide at least one module of the module stack unit to a client unit;
  a first determining unit to determine if the provided module has been modified by the client unit;
  a second determining unit of the server unit to determining dependency data, at least including information on the dependency of further modules of the module stack from the provided module; and
  a providing unit of the server unit to provide the dependency data of the other modules of the module stack unit from the provided module.

Moreover, the client unit and the server unit may use different processes on different processors of a server unit, whereby the client unit and the server unit may be distant to each other, e.g., the client unit or the server unit may be in a vehicle and the client unit or the server unit may be in the cloud. Further, the client unit and the server unit may use different processes on the same processor unit of a server unit or the client unit and the server unit may use different processes and different processor units of a server unit or multiple server units. Furthermore, the client unit and the server unit may use different computational entities on the same processor unit of a server unit.

In an implementation, the system may further include a service stub unit, a service proxy unit, a dynamic runtime unit of the server unit and/or a broker unit of the server unit;
  whereby at least one server unit of the server-client-structure may includes the service stub unit, in particular each server unit of the server-client-structure may includes a service stub unit; and/or
  whereby at least one client unit of the server-client-structure may includes the service proxy unit, in particular each client unit of the server-client-structure may includes a service client unit.

In other words, a service stub unit, preferably a specific service stub unit, and/or a service proxy unit, preferably a specific service proxy unit, may be used by every client of the service framework and/or by every server of the service framework. Further, the service stub unit and/or the service proxy unit may use the dynamically load data of the dynamic unit to generate one or more runtimes of the service framework.

Further, the service stub unit and/or the service proxy unit may be configured to connect/bridge the client unit and/or the server unit to an interface or an API of at least one runtime of the service framework so that the client unit and/or the server unit may communicate with the at least one runtime of the service framework.

A further aspect of the present disclosure relates to a computer program element with instructions, which, when executed on the at least one server and/or on the at least one client of a client-server-structure, is configured to carry out the steps of the herein disclosed method in a herein disclosed system.

A further aspect of the present disclosure relates to a computer readable storage/medium storing instructions of the herein disclosed computer program element.

BRIEF DESCRIPTION OF THE DRAWINGS

In the following, the disclosure is described exemplarily with reference to the enclosed figures, in which.

Notably, the figures are merely schematic representations and serve only to illustrate examples of the present disclosure. Identical or equivalent elements are in principle provided with the same reference signs.

DETAILED DESCRIPTION

Figure 1:
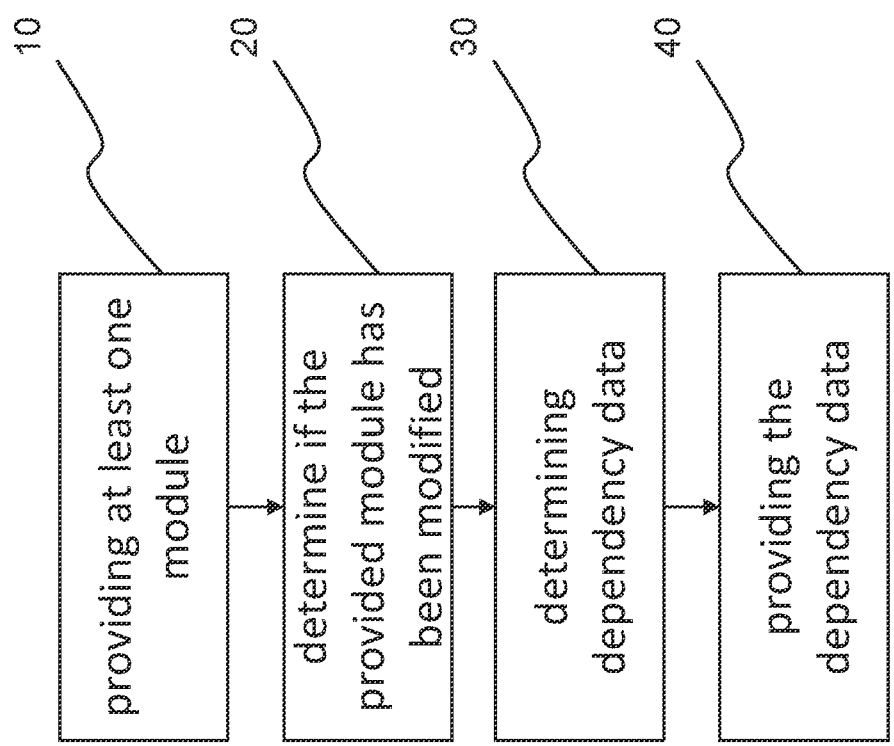
FIG. 1 is a schematic diagram of an example of a process of the disclosed method.

FIG. 1 shows a schematic diagram of a process of the disclosed method, whereby the method includes the steps providing 10 at least one module of a module stack to a client; determine 20 if the provided module has been modified by the client; determining 30 dependency data, at least including information on the dependency of further modules of the module stack from the provided module; and providing 40 the dependency data of the other modules of the module stack from the provided module.

Figure 2:
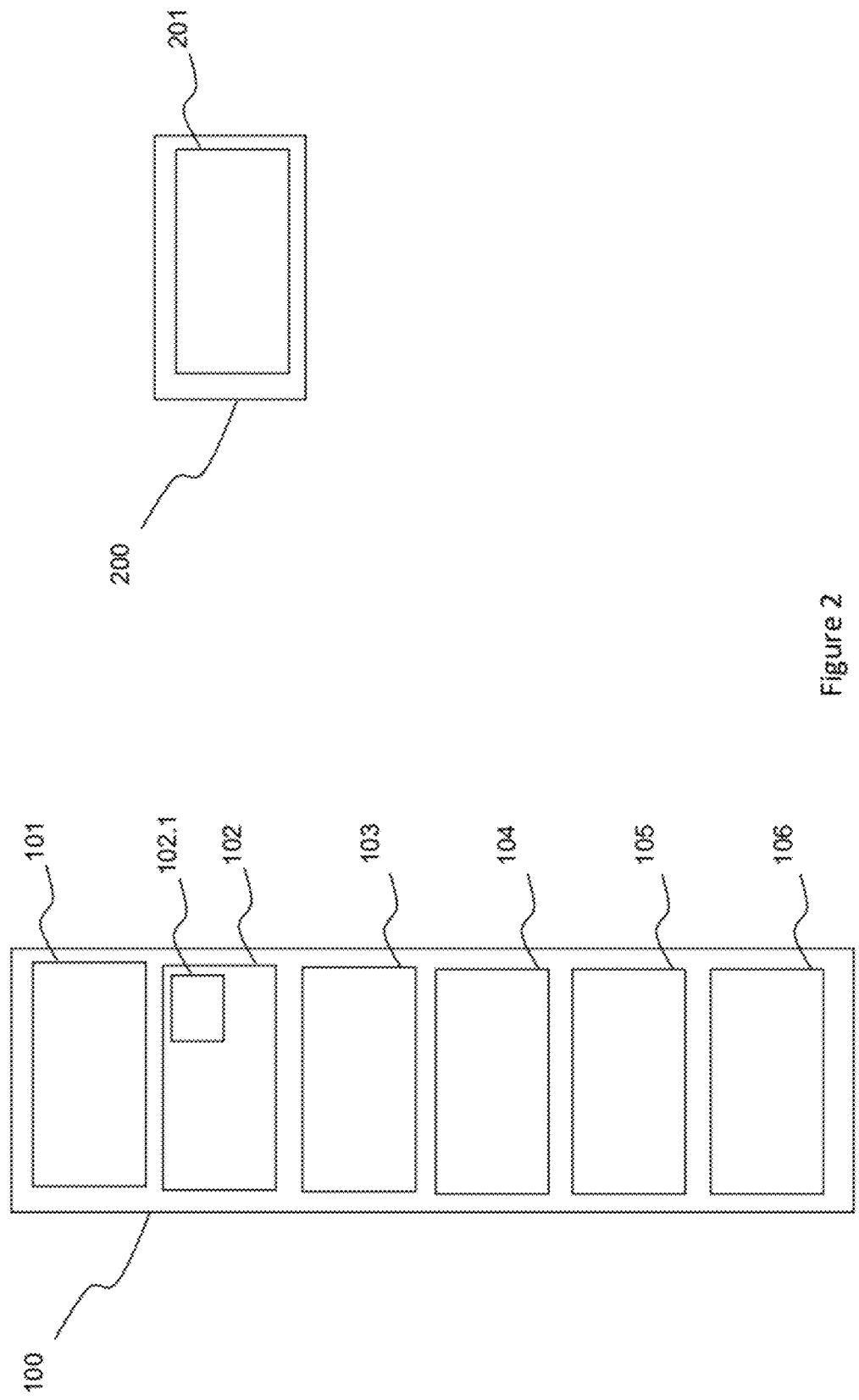
FIG. 2 is a schematic overview of an example of the disclosed system.

FIG. 2 shows a schematic overview of an implementation of a disclosed server-client-structure, with a server unit 100 of the server-client-structure and a client unit 200 of the server-client-structure with a proxy unit 201 for a service framework to develop application services.

The server 100 includes a module stack unit 102 to provide at least one module 102.1 of the module stack unit 102 to the client unit 200. A first determining unit 103 to determine if the provided module has been modified by the client unit 200. A second determining unit 104 of the server unit 100 to determining dependency data, at least including information on the dependency of further modules of the module stack 102 from the provided module. As well as, a providing unit 105 of the server unit 100 to provide the dependency data of the other modules of the module stack unit 102 from the provided module. Further, the server 100 includes a service stub unit 101 and a dynamic runtime unit 106.

Figure 3:
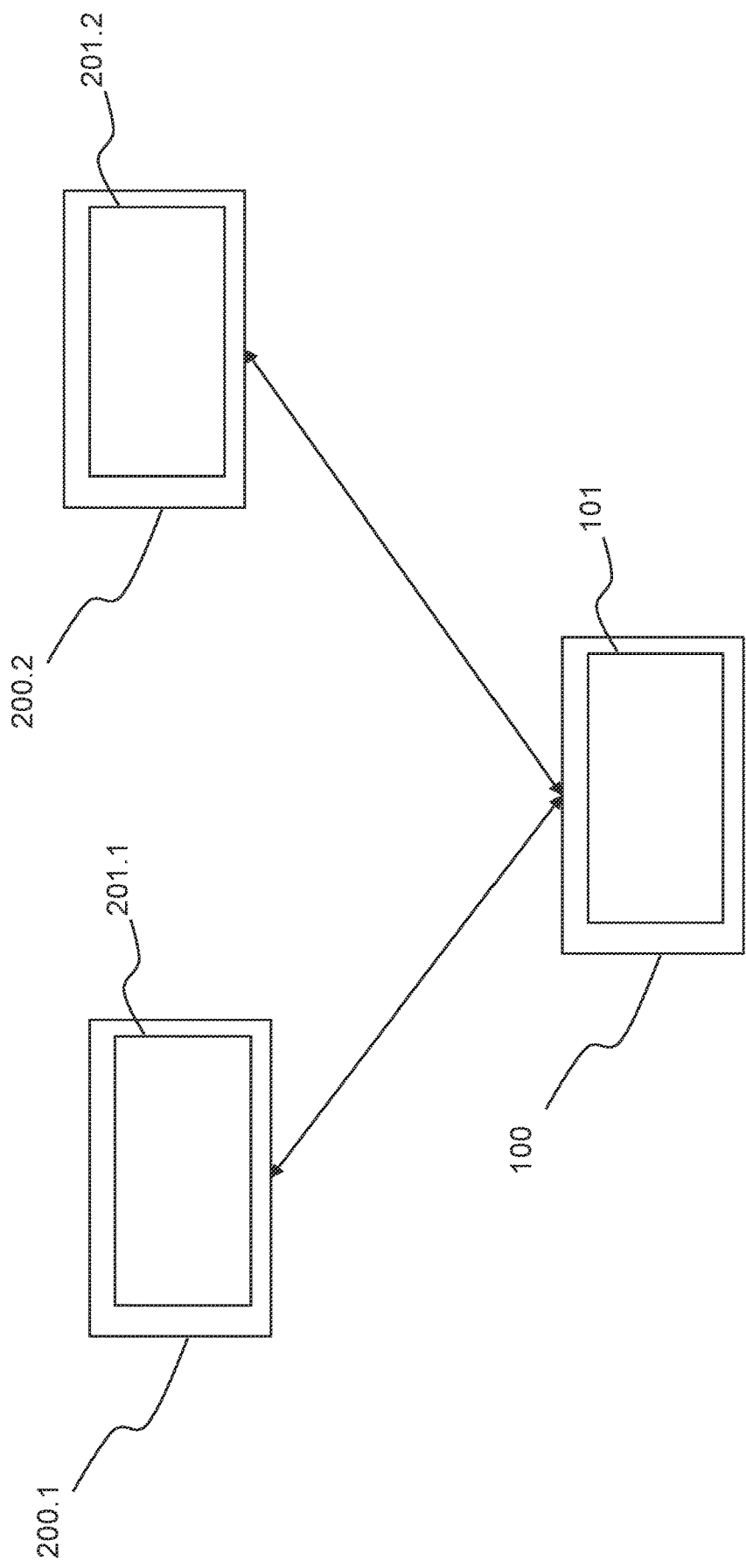
FIG. 3 is a schematic overview of an example of an interface in a server-client-structure with the disclosed system and the disclosed method.

FIG. 3 shows a schematic overview of an example of an interface in a server-client-structure with the disclosed system and the disclosed method, whereby a server unit 100 is shown in a simplified way with a service stub unit 101 as an example. Further, a first client unit 200.1 with a first proxy unit 201.1 and a second client unit 200.2 with a second proxy unit 201.2 is shown.

Thereby, data is transported between the client 200 and the server 100 and a service discovery is provided by the interface. However, these two functions are offered separately and decoupled from each other, so that several parallel transports are possible in parallel with service discovery.

Figure 4:
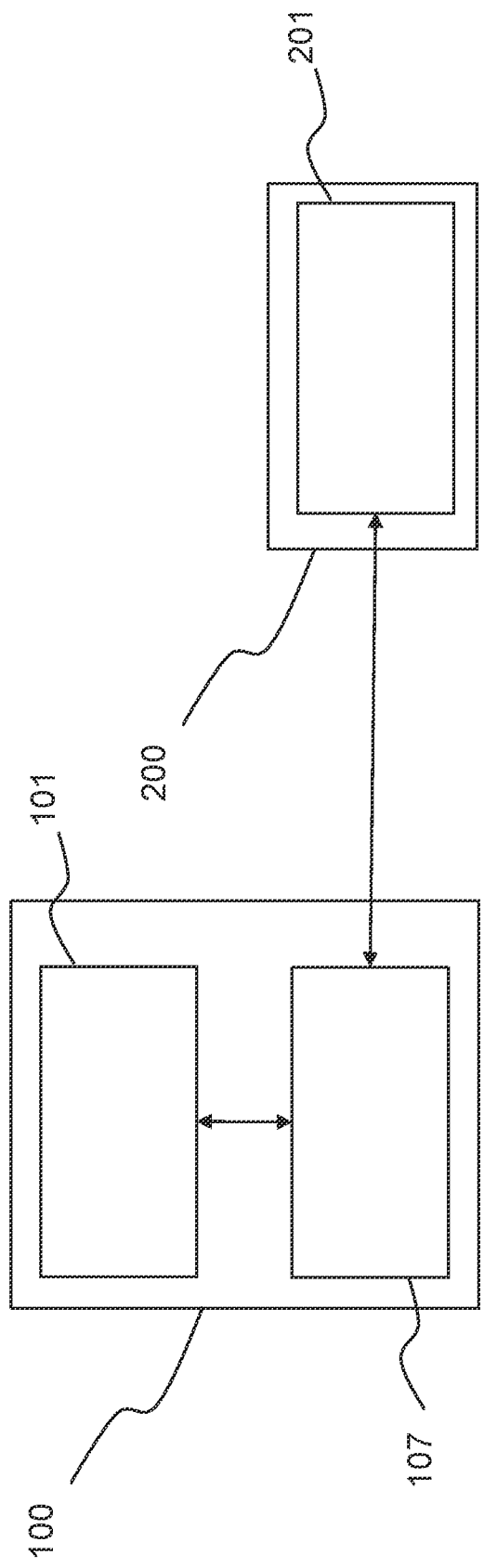
FIG. 4 is a schematic overview of an example of a service discovery in a server-client-structure with the disclosed system and the disclosed method.

FIG. 4 shows a schematic overview of an example of a service discovery in a server-client-structure with the disclosed system and the disclosed method, whereby a server unit 100 is shown in a simplified way with a service stub unit 101 and a broker unit 107 as an example. Further, a client unit 200 with a proxy unit 201 is shown.

Further, the broker unit 107 monitors the communication between the stub unit 101 and the proxy unit 201. Whereby, the broker unit 107 monitors the communication regarding the availability of the service framework based on the interface id, interface version and/or instance id to provide the availability of a service of the server to the client. Since this providing is decoupled from the actual data transport, allowing multiple parallel discovery of services in parallel with the transport.

Other variations to the disclosed example can be understood and effected by those skilled in the art in practicing the claimed subject matter, from the study of the drawings, the disclosure, and the dependent claims. In particular, respective parts/functions of the respective example described above may also be combined with each other. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A computer-implemented method for a service framework to develop an application service, comprising:
   by a module stack unit stored in a memory and executed by a processor of a server unit, interfacing code of at least one provided module of a module stack to a client unit over an interface between the server unit and the client unit;
   by a providing unit stored in the memory and executed by the processor of the server unit, providing, subsequent to the code of the provided module modified by the client unit in a matter that would make the provided module incompatible with code of a dependent module, dependency data comprising at least information on the dependency of further modules of the module stack from the provided module to provide the application service, wherein the dependency data of the further modules comprises dynamic runtime data affecting execution of code; and
   executing a portion of a runtime of the dynamic runtime data at the server unit to control transport between the server unit and the client unit in response to executing another portion of the runtime at the client unit to provide the service framework including the portion of the runtime executed at the server unit subsequent to the code of the provided module being modified by the client unit given the dependency data of the further modules.

2. The method according to claim 1, wherein the providing of the at least one module of a module stack and/or providing of the dependency data of the further modules of the module stack from the provided module further comprises providing service interface data.

3. The method according to claim 2, wherein the service interface data comprises service proxy data, whereby the service proxy data comprises at least event values, method values and/or property values.

4. The method according to claim 2, wherein the service interface data comprises service stub data, whereby the service stub data comprises at least event values and/or property values.

5. The method according to claim 1, wherein the dynamic runtime data comprises broker data, which comprises at least a service framework value.

6. The method according to claim 1, wherein the dynamic runtime data comprises service configuration data, which comprises at least a module value, a dynamic runtime value and/or a specific service value.

7. The method according to claim 1, wherein the dynamic runtime data comprises dynamically load data.

8. The method according to claim 1, wherein the dynamic runtime data comprises service discovery data.

9. The method according to claim 1, wherein the providing of the at least one module of a module stack and/or providing of the dependency data of the further modules of the module stack from the provided module further comprises providing communication parameter data and/or system configuration data.

10. The method according to claim 1, wherein the at least one module comprises program code for use in the application service, in particular C/C++, python, Java and/or HTTP.

11. A system that is implemented as a server-client-structure for a service framework to develop an application service, comprising:
   multiple processors;
   multiple memories each storing a non-transitory computer-readable medium comprising instructions executed by one or more of the multiple processors to provide:
      a module stack unit stored in a memory and executed by a processor of a server unit to interface code of at least one provided module of a module stack to a client unit over an interface between the server unit and the client unit;
      a providing unit stored in the memory and executed by the processor of the server unit to provide, subsequent to the code of the provided module modified by the client unit in a matter that would make the provided module incompatible with code of a dependent module, dependency data comprising at least information on the dependency of further modules of the module stack from the provided module to provide the application service, wherein the dependency data of the further modules comprises dynamic runtime data affecting execution of code; and
      a portion of a runtime of the dynamic runtime data executed at the server unit to control transport between the server unit and the client unit in response to executing another portion of the runtime at the client unit to provide the service framework including the portion of the runtime executed at the server unit subsequent to the code of the provided module being modified by the client unit given the dependency data of the further modules.

12. The system according to claim 11, wherein the system further comprises a service stub unit, a service proxy unit, a dynamic runtime unit of the server unit and/or a broker unit of the server unit;
   wherein at least one server unit of the server-client-structure comprises the service stub unit, in particular each server unit of the server-client-structure comprises a service stub unit; and/or
   wherein at least one client unit of the server-client-structure comprises the service proxy unit, in particular each client unit of the server-client-structure comprises a service client unit.

13. A non-transitory computer-readable medium comprising instructions stored in a memory and executed by a processor to carry out steps comprising:
   by a module stack unit stored in a memory and executed by a processor of a server unit, interfacing code of at least one provided module of a module stack to a client unit over an interface between the server unit and the client unit;
   by a providing unit stored in the memory and executed by the processor of the server unit, providing, subsequent to the code of the provided module modified by the client unit in a matter that would make the provided module incompatible with code of a dependent module, dependency data comprising at least information on the dependency of further modules of the module stack from the provided module to provide the application service, wherein the dependency data of the further modules comprises dynamic runtime data affecting execution of code; and
   executing a portion of a runtime of the dynamic runtime data at the server unit to control transport between the server unit and the client unit in response to executing another portion of the runtime at the client unit to provide the service framework including the portion of the runtime executed at the server unit subsequent to the code of the provided module being modified by the client unit given the dependency data of the further modules.

\* \* \* \* \*